(12) United States Patent
Verhaeghe et al.

(10) Patent No.: US 9,101,092 B2
(45) Date of Patent: Aug. 11, 2015

(54) SQUARE BALER COMPRISING A CONTROL SYSTEM

(75) Inventors: Didier Verhaeghe, Ieper (BE); Bart Missotten, Winksele Herent (BE)

(73) Assignee: CNH Industrial America LLC, New Holland, PA (US)

( * ) Notice: Subject to any disclaimer, the term of this patent is extended or adjusted under 35 U.S.C. 154(b) by 280 days.

(21) Appl. No.: 13/496,626

(22) PCT Filed: Sep. 15, 2010

(86) PCT No.: PCT/EP2010/063539
§ 371 (c)(1),
(2), (4) Date: Jun. 1, 2012

(87) PCT Pub. No.: WO2011/032980
PCT Pub. Date: Mar. 24, 2011

(65) Prior Publication Data
US 2012/0240797 A1    Sep. 27, 2012

(30) Foreign Application Priority Data
Sep. 17, 2009  (BE) .................................. 2009/0573

(51) Int. Cl.
*B30B 15/30* (2006.01)
*A01F 15/08* (2006.01)

(52) U.S. Cl.
CPC ..... *A01F 15/0825* (2013.01); *A01F 2015/0891* (2013.01)

(58) Field of Classification Search
CPC ..................... A01F 15/0825; A01F 2015/0891
USPC ......... 100/7, 43, 45, 48, 49, 99, 188 R, 3, 40, 100/50, 51, 76, 87, 88, 89, 178, 179, 180, 100/189, 215, 216, 240–245; 56/10.2 R, 341
See application file for complete search history.

(56) References Cited

U.S. PATENT DOCUMENTS

| | | | | | |
|---|---|---|---|---|---|
| 2,796,825 | A | * | 6/1957 | Kriegbaum et al. | 100/43 |
| 2,982,201 | A | * | 5/1961 | Kruger et al. | 100/99 |
| 4,202,262 | A | * | 5/1980 | Claas et al. | 100/4 |
| 4,742,880 | A | * | 5/1988 | Schrag et al. | 177/136 |
| 4,850,271 | A | * | 7/1989 | White et al. | 100/88 |
| 4,885,531 | A | * | 12/1989 | Stowell | 324/695 |
| 5,384,436 | A | * | 1/1995 | Pritchard | 177/136 |
| 5,819,643 | A | * | 10/1998 | McIlwain et al. | 100/43 |
| 6,026,741 | A | * | 2/2000 | Lippens et al. | 100/41 |

(Continued)

FOREIGN PATENT DOCUMENTS

EP        1606992 A1 * 12/2005

*Primary Examiner* — Shelley Self
*Assistant Examiner* — Leonel Vasquez
(74) *Attorney, Agent, or Firm* — Patrick M. Sheldrake; Seyed V. Sharifi T.

(57) ABSTRACT

A square baler having a control system including at least one density sensor for measuring the relative density of crop slices within the intake duct and/or the intake region of the baling chamber. A correlation function is determined by correlating the measured relative density of slices in the intake duct and/or the intake region of the baling chamber with the cumulative weight of these slices after they have been compressed and bound to form a completed bale. The control system predicts a weight of the slice in the intake duct and/or the intake region of the baling chamber derived from the measured relative density values of this slice and the computed correlation function.

13 Claims, 4 Drawing Sheets

(56) References Cited

U.S. PATENT DOCUMENTS

| | | |
|---|---|---|
| 6,209,450 B1 * | 4/2001 | Naaktgeboren et al. ........... 100/4 |
| 6,248,963 B1 * | 6/2001 | Gottlober ...................... 177/136 |
| 6,378,276 B1 * | 4/2002 | Dorge et al. .................... 53/502 |
| 7,331,168 B2 * | 2/2008 | Dubois .......................... 56/341 |
| 7,478,518 B2 * | 1/2009 | Kraus et al. ................. 56/10.2 R |
| 8,627,766 B2 * | 1/2014 | Verhaeghe et al. ............. 100/45 |
| 2004/0187468 A1 * | 9/2004 | Krone et al. .................... 56/341 |
| 2004/0250703 A1 * | 12/2004 | Viaud et al. ..................... 100/87 |
| 2005/0072133 A1 * | 4/2005 | Dubois .......................... 56/341 |
| 2012/0000377 A1 * | 1/2012 | Verhaeghe et al. ............. 100/45 |
| 2013/0008324 A1 * | 1/2013 | Verhaeghe et al. ............. 100/99 |

* cited by examiner

Prior Art

Fig. 7

SQUARE BALER COMPRISING A CONTROL SYSTEM

This application is the US National Stage filing of International Application Serial No. PCT/EP2010/063539 filed on Sep. 15, 2010 which claims priority to Belgium Application BE2009/0573 filed Sep. 17, 2009, each of which is incorporated herein by reference in its entirety.

TECHNICAL FIELD

The present invention relates to a square baler comprising a control system and sensors for measuring the weight and size of completed bales and a processor for determining settings of a plurality of operating parameters of the baler to enable a desired bale weight to be achieved.

BACKGROUND ART

Balers are machines that pick-up crop that has been deposited in windrows or swathes and compact it into bales. The crop may be, for example, straw that has been deposited by a combine harvester or grass cut by a mowing machine. The balers themselves can be self-propelled or towed by a tractor and the bales can be round or square. The present invention is particularly concerned with square balers but is not restricted to any particular crop.

As with all balers, a square baler has a pick-up mechanism for raising the crop from the ground, a crop transport mechanism and a baling chamber. The transport mechanism in a square baler comprises an intake duct that acts as a pre-compression chamber into which the crop is introduced by a rotor and in which the crop is pre-compressed by a packer. Sometimes a cutter is provided at the lower end of the intake duct to chop the crop before it is formed into bales.

When a desired crop density has been reached in the intake duct, as detected usually by movement of a spring biased flap in the wall of the intake duct, a so-called stuffer is actuated to upload the contents of the intake duct into a square baling chamber where it is compressed further to form a bale. The bale is built up in slices in this way until the desired bale length is reached.

The compression of the crop in the baling chamber is carried out by a constantly reciprocating plunger which pushes the crop material being compressed against a resistance offered by previously compressed crop material that is in the baling chamber. To set its resistance to movement, the previously formed bale is gripped from the sides and/or from above by walls to which a hydraulic pressure is applied in a direction to compress the bale.

The hydraulic pressure that is varied to regulate the density of the bale being formed can be set manually or automatically. In the latter case, instead of manually setting the magnitude of the hydraulic pressure, the operator sets a desired degree of resistance. The actual degree of resistance is measured, for example from the reaction force on the plunger, and compared with the desired resistance to derive an error signal. The hydraulic pressure is then varied in a closed feedback control loop to minimise the error signal and thereby attain the desired resistance set point.

Once a bale in the baling chamber reaches the desired size, lengths of twine are wrapped around the bale and they are knotted to complete the baling process.

Because square balers are well known and well documented in the prior art, it is not believed necessary to describe it in greater detail within the present context.

There are numerous operating parameters that can be set by the operator that affect the baling operation, such as for example the quality of the bales themselves or the baling efficiency, i.e. the weight of crop baled in a given time.

Bale quality is unacceptable for example if the bale density is too low or too high, or if the bale length or weight is outside a specified range, or if the bale density is not sufficiently uniform across the width or length of the bale.

In certain circumstances it is required to keep the bale weight within certain limits to achieve a desired baling quality. The present invention is in these circumstances thus concerned with bale weight uniformity. To help achieve this, it is known for balers to include a weighing apparatus that measures the weight of a bale after it has been formed and before it is discharged onto the ground from the rear end of the baler. The readings from such a weighing apparatus are used to indicate the weight of a given bale, its density and also the total weight of the crop gathered from a field or baled in one day.

Assuming operation with the same machine settings, the weight of any given bale will in practice depend on certain parameters of the crop. The weight not only varies from crop to crop, but also with the moisture content of the crop. Because the moisture content, in particular, is sensitive to weather conditions, even when working on the same day in the same field, variations in bale weight can occur.

There are different control parameters that have an effect on bale density. In particular, the hydraulic pressure that varies the load on the plunger, stuffer speed, the density in the intake duct at which a stuffer cycle is triggered and the speed of movement of the baler all have an effect on the weight of the bales being formed.

However, the interaction between these various control parameters is complicated for reasons that will become clear from the ensuing description and, because of this complexity, it is difficult for an operator, especially one with less experience, to know what to do to restore the bales to their desired weight, when weight measurement indicates that they are too heavy or too light.

In prior art weighing systems and associated control systems, such as for example described in U.S. Pat. No. 2,796, 825, an operating parameter, such as the hydraulic pressure to regulate the density of the bale, is controlled in such a manner that if the bale weight differs from a desired value the operating parameter is adjusted for restoring the bale weight to the desired value.

These control systems suffer from the disadvantage that the recommended operating parameters are determined using data that was gathered relating to crop from a preceding completed bale, rather than data relating to the bale currently being formed in the baling chamber. As a result, the control system suffers from what may be termed hysteresis lag.

SUMMARY OF INVENTION

With a view to mitigating the foregoing problem, the present invention provides a square baler comprising:
  a control system;
  a baling chamber;
  an intake duct;
  a baling chamber comprising an intake region;
  a sensor for measuring the weight of completed bales, characterised in that the square baler further comprises:
  at least one density sensor for measuring the relative density of crop slices within the intake duct and/or the intake region of the baling chamber; and means for determining a correlation function by correlating the measured relative density of slices in the intake duct and/or the intake region of the baling chamber with the cumulative weight of these slices after they have been compressed and bound to form a completed bale, the control system being operative to determine a predicted weight of the slice in the intake duct and/or the intake region of the baling chamber derived from the measured relative density values of this slice and the computed correlation function.

According to an embodiment of the invention the control system is operative to determine a predicted weight of the bale being formed in the baling chamber based on the predicted weight of its constituting slices.

According to a further embodiment of the invention the control system is operative to determine settings of operating parameters of the baler in dependence upon the predicted weight of the slice in the intake duct and/or the intake region of the baling chamber.

According to a further embodiment of the invention the control system is operative to determine settings of operating parameters of the baler to enable a desired bale weight to be achieved.

In this way the control system is able to react to changes in bale weight without any hysteresis lag.

According to a further embodiment of the invention the baler further comprises a sensor for measuring the size of bales being formed and its constituting slices; and the control system is operative to determine a predicted absolute density of the slice in the intake duct and/or the intake region of the baling chamber derived from the predicted weight of this slice and the measured size of this slice.

This also enables a more precise yield mapping than in known systems in which only the yield could be determined for a completed bale.

According to a further embodiment of the invention the control system is operative to determine a predicted absolute density of the bale being formed in the baling chamber based on the predicted absolute density of its constituting slices.

According to a further embodiment of the invention the control system is operative to determine settings of operating parameters of the baler in dependence upon the predicted absolute density of the slice in the intake duct and/or the intake region of the baling chamber.

In a copending application BE2009/0167 the applicant has proposed measuring the relative crop density in the intake duct using non-contact sensors in addition to the use of a mechanically operated sensor that triggers an uploading cycle of a slice from the intake duct into the baling chamber. Using relative density readings within different parts of the intake duct, it is possible to provide steering recommendations to achieve more uniform crop density across the width of the bales. However, no use could be made of the non-contact density readings taken within the intake duct to achieve a desired bale weight or density in the absence of any known correlation between the relative density of a number of slices in the intake duct and the weight of the same slices when forming a completed bale.

The present invention proposes predicting the weight that a slice, still in the process of being collected in the intake duct or being loaded into the intake region of the baling chamber, will have in a completed bale. This prediction is based on a relative density measurement taken in the intake duct and a correlation function obtained by correlating relative density measurements of past slices, taken first when they were in the intake duct or the intake region of the baling chamber and the cumulative weight of these slices later when they were part of a completed bale on the discharge chute of the baler.

According to a further embodiment of the invention the control system is operative to determine settings of operating parameters of the baler to enable a desired absolute bale density to be achieved.

By using a predicted weight for the slice that is currently being collected in the intake duct or loaded into the intake region of the bale chamber instead of a measured weight of a previously completed bale, the invention enables the problem of hysteresis lag to be avoided.

It is not material to the invention how the settings of the operating parameters of the baler determined by the control system are implemented. In particular, they may be implemented automatically, they may be implemented only after approval by the vehicle operator or they may be given as recommended setting to the operator to be implemented manually by the operator.

The correlation function may be a simple weighting factor if the densities measured in the intake duct and in the completed bales correlate linearly with one another. However if the correlation is not linear, a prediction of the weight can be made using a computed algorithm or a look-up table.

BRIEF DESCRIPTION OF DRAWINGS

The invention will now be described further, by way of example, with reference to the accompanying drawings, in which.

DESCRIPTION OF EMBODIMENTS

Figure 1:
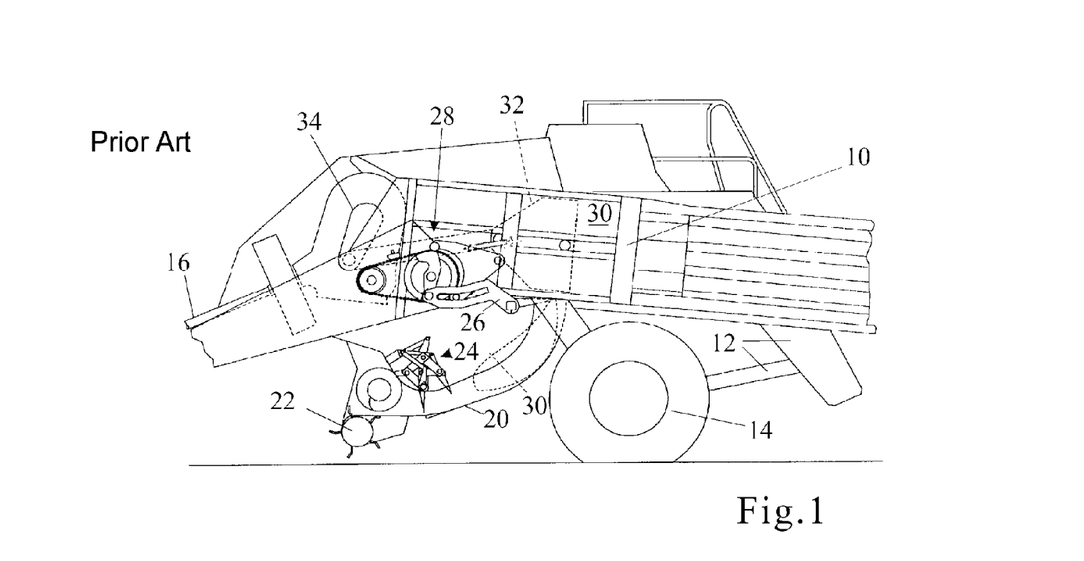
FIG. 1 is a schematic representation of a square baler according to the invention.

FIG. 1 shows a side view of a square baler according to the invention. The figure corresponds to FIG. 1 of EP 0636308 in which all the components of the square baler are described in detail. FIG. 1 will only be described herein to the extent necessary for an understanding of the present invention.

The square baler 1 comprises a baling chamber 10 supported by a frame 12 resting on wheels 14. The baling chamber 10 is slightly inclined relative to the horizontal, being lower at the back than at the front. At its front end, the baler has an attachment point (not shown) by means of which it is hitched to a tractor (not shown) and a power input shaft 16 that is connected to the power take off (PTO) shaft of the tractor.

A pre-compression chamber 20 also referred to as intake duct 20 is located beneath the baling chamber 10. At the lower end of the pre-compression chamber 20, a pick-up 22 with tines picks crop from a swath lying on the ground. The crop is compacted by a packer 24 until the pre-compression chamber 20 is filled to a desired density, thereby forming a slice. According to an alternative embodiment (not shown) it is also possible not to provide the packer 24 or to provide for example a rotor cutter instead of the packer 24. The top wall of the pre-compression chamber has slots that can be penetrated by the prongs of a fork 26 that forms part of a loading mechanism more fully described in EP0636308. For the present invention, it suffices to understand that the fork is moved by a system 28 of cams and levers such that it follows a kidney shaped path represented by a broken line 30 in the drawing.

Once a slice has been formed in the pre-compression chamber 20, a loading cycle is commenced during which the prongs of the fork 26 are inserted at the lower end of the pre-compression chamber. As the cycle continues, the slice is moved up into a baling chamber 10 where a plunger 32 further compresses the slices to form a bale. Both the plunger 32 and the system 28 of cams and levers are drive by a gearbox 34 connected to the power input shaft 16.

As is well known, but not shown in FIG. 1, the baler also has a mechanism for encircling the bales, and sometimes individual slices within the bale, with lengths of twine and knotters for forming knots in the twine.

Figure 7:
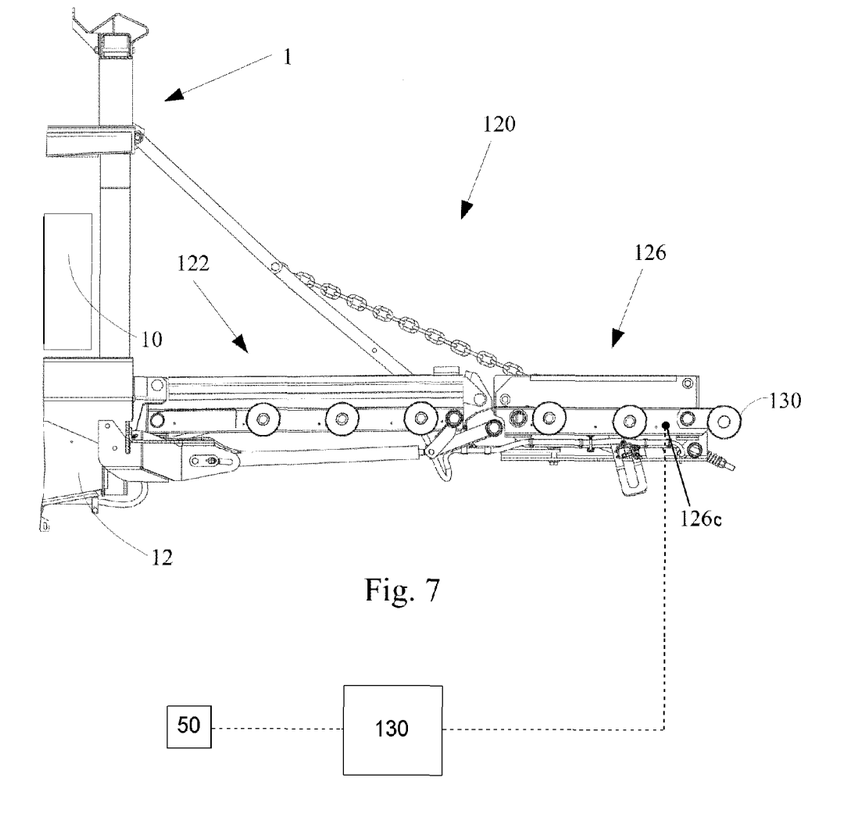
FIG. 7 shows a discharge chute of the baler in FIG. 1 incorporating a weighing system.

The trailing end of the baler, not shown in FIG. 1, shown in more detail in FIG. 7, has an inclined discharge chute 120. The discharge chute 120 according to the embodiment shown in FIG. 7, known from for example EP1935232, is formed as conveyor comprising rollers 130 with a front part 122 and a rear part 126 incorporating a weighing system and sensor 126c that determines the weight of each bale before the bale is deposited on the ground. The construction and design of the weighing system are known in the art and need not be described in detail in the present context.

The above description has been given only by way of background and all that is shown in FIG. 1 and described so far is well known from the prior art.

Figure 2:
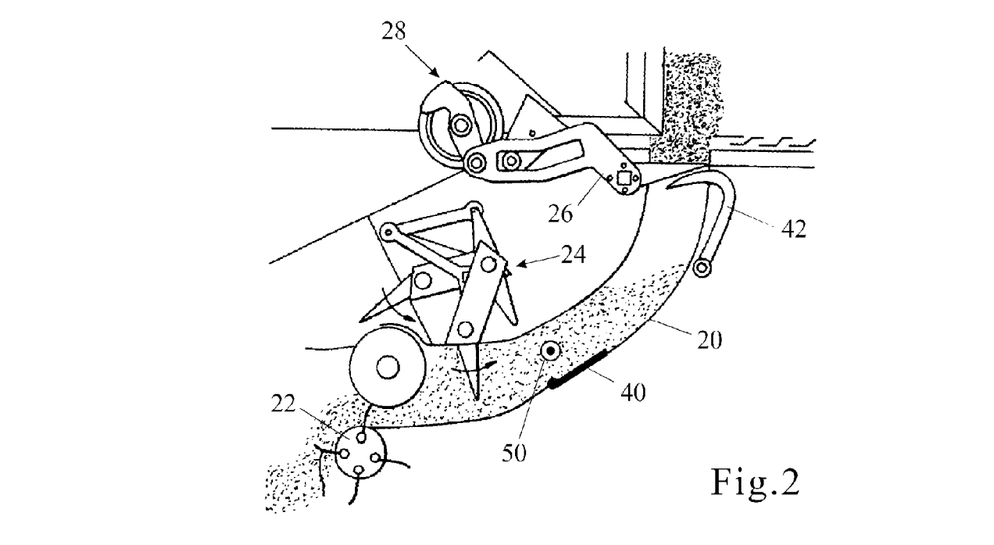
FIG. 2 shows the pre-compression chamber of a square baler according to FIG. 1 drawn to an enlarged scale.

FIG. 2 is a modification of FIG. 1d of EP1153538 and serves to explain further the background to the present invention.

The pre-compression chamber shown in FIG. 2 comprises a mechanical sensor 40 on its lower wall. This mechanical sensor 40 can for example comprise a sensor plate or a spring biased door in which the strength of the spring acting on the door is such that the door commences to open when the slice being packed within the pre-compression chamber reaches the desired density. On the basis of the mechanical sensor 40 the system 28 is triggered in synchronism with the plunger 32 to commence a load cycle to transfer a slice from the precompression chamber 20 into the baling chamber 10. FIG. 2 also shows a hook 42 which retains the slice being formed in the pre-compression chamber 20, the hook 42 being retracted at the commencement of the loading operation triggered by the mechanical sensor 40. The mechanical sensor 40 and the hook 42 are both known from, and described in greater detail in, EP1153538.

Figure 3:
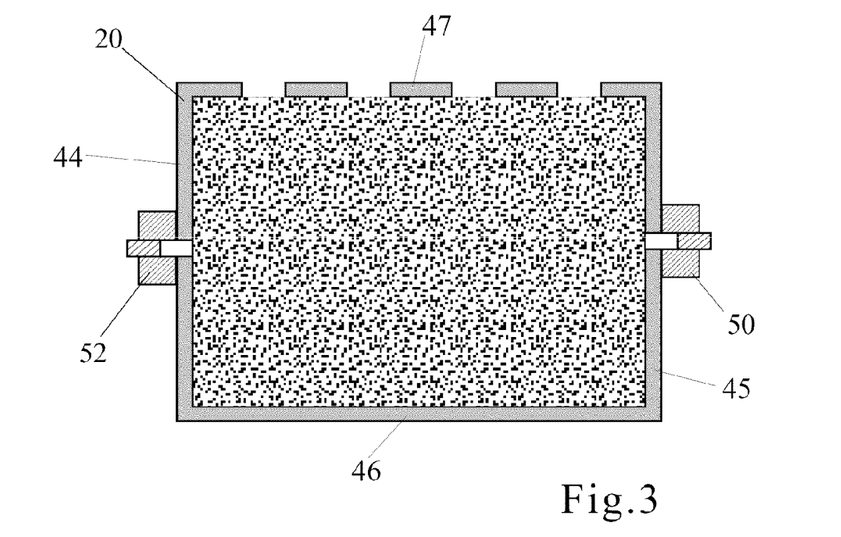
FIG. 3 is a section in the plane A-A in FIG. 2 through a first embodiment of the invention.
Figure 4:
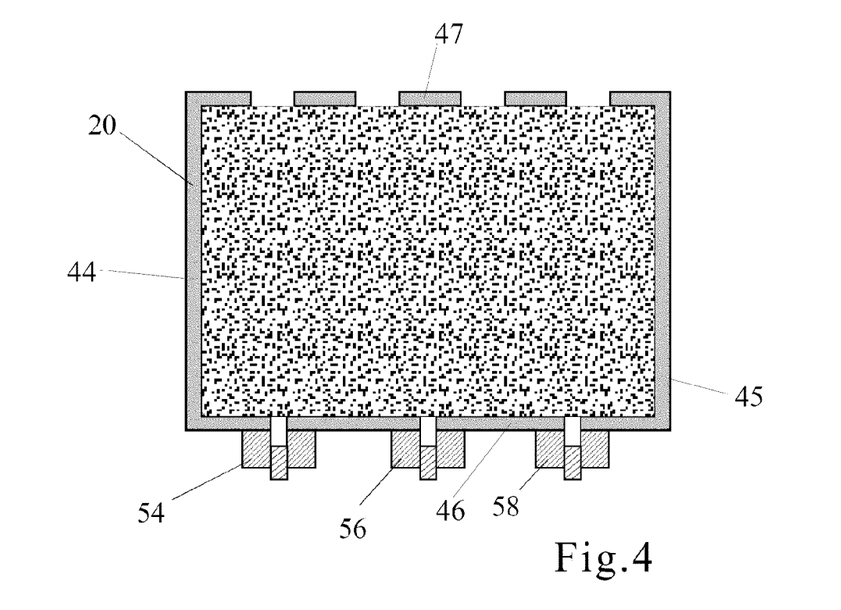
FIG. 4 is a section in the plane A-A in FIG. 2 through a second embodiment.

In FIGS. 2 and 3, corresponding to the Figures of a copending application BE2009/0167 of the applicant, two non-contact sensors 50 and 52 are placed in the opposite side walls 44, 45 of the pre-compression chamber 20. In FIG. 4, three such sensors 54, 56 and 58 are arranged in the bottom wall 46 of the pre-compression chamber 20. As a further possibility the sensors 54, 56 and 58 may be arrange in the top wall 47, or they may be distributed between the top wall 47, the bottom wall 46 and/or the side walls 44, 45. It is clear that instead of two or three non-contact sensors, four five or more non-contact sensors can be arranged distributed between the top wall 47, the bottom wall 46 and/or the side walls 44, 45.

The non-contact sensors 50 to 58, as described in the co-pending application BE2009/0167, can operated in the same manner as in EP 1935233 to indicate the relative density of the crop at different points across the width of a slice as it is being packed. It concerns for example infra-red sensors, ultra-violet sensors, photo-electrical sensors, ultrasonic sensors, or any other non-contact sensors that can determine the ratio between the crop material and the voids in between, for example on the basis of the determination of the reflection, absorption or another way. The signals from the different sensors are therefore conventionally processed, for example by a control system 130 of the baler, to provide the operator only with a left/right steering indication to enable an even density to be achieved in each slice before it is transferred to the baling chamber. If the density of each slice is uniform, the density throughout the bale will of necessity also be even. According to a further embodiment it is also possible to let the control system 130 automatically control the operating parameters of the baler to achieve a uniform density.

Figure 5:
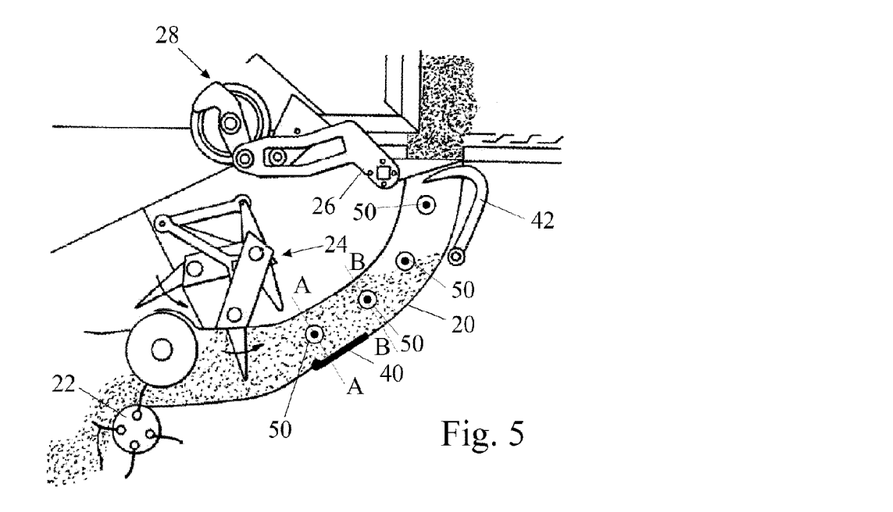
FIG. 5 shows the pre-compression chamber of a third embodiment.
Figure 6:
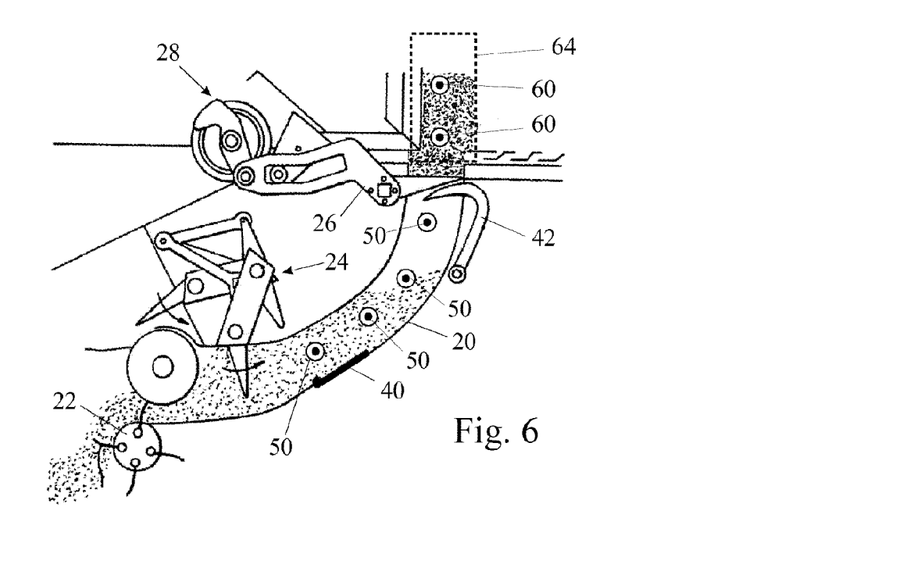
FIG. 6 shows the pre-compression chamber of a fourth embodiment.

As described in further detail in the copending application, it is also possible, as shown in FIG. 5, to arrange a plurality of sensors 50 distributed over the side wall 45 and a plurality of sensors 52 distributed over the opposing side wall 44. The sections A-A, B-B and similar sections at the height of other non-contact sensors can be similar to the section shown in FIG. 3. As shown in FIG. 6, also described in further detail in the co-pending application, it is even possible to arrange non-contact sensors 60 in the side walls or the top wall of the baling chamber 10, but specifically in the intake region of the baling chamber 10 that is situated is forming an extension of the precompression chamber 20 in which the slice is loaded by the stuffer fork 26 during a loading cycle before it is compressed by the plunger 32.

It has also previously been proposed to let the control system 130 of the baler use the signal from one or more non-contact sensors 50 to 58 to determine when the slice in the pre-compression chamber has reached a sufficient density to be transferred by the loading mechanism into the baling chamber. However, no mention has been made in the copending application of the density measurements made by the sensors 50 to 58 and 60 to enable a control system 130 to regulate the weight and/or density of completed bales.

The visual display will typically display to the operator the baler speed, the load on the plunger, hydraulic pressure of the compression system and the capacity of the intake duct. The display also indicates the weight of the last ejected bale and the cumulative total weight of crop that has been baled. The cumulative total can be reset at the commencement of a day or a job.

An expert operator will know from past experience how to set the various control parameters to optimise the efficiency of the baler (measured by the weight of crop baled in a given time) and achieve the desired bale weight. However, because control of these various parameters is not intuitive, for reasons that will be explained below, their setting can confuse an inexperienced operator.

An increase in the plunger load will clearly increase packing density and therefore increase bale weight. It is however not as simple to predict the effect of varying the crop density in the intake duct at which the sensor in the intake duct will initiate a stuffer cycle. The reason for this is that the uploading of slices into the square baling chamber 10 cannot be carried out at will but must be synchronised with the movement of the reciprocating plunger 32.

To elaborate on this point, the plunger 32 in the baling chamber 10 is in constant reciprocating motion. During each compression stroke, it pushes crop present in the baling chamber 10 towards the discharge end and, during its return stroke, it separates from the crop leaving space for a new slice to be uploaded from the intake duct 20 by the stuffer. If the stuffer attempts to upload a slice while the plunger 32 is not near its bottom dead centre at the end of a return stroke then the entrance to the square baling chamber 10 will be obstructed either by the crop or by the plunger 32.

Thus, when the crop in the intake duct 20 reaches the density required to initiate a stuffer cycle, that cycle is not commenced immediately but it is timed to ensure that the slice is transferred into the baling chamber 10 when the plunger 32 is next near its bottom dead centre position. Consequently, the crop density in the intake duct 20 continues to increase while waiting for the plunger 32 to reach the appropriate position in its cycle, resulting in the density of the slice uploaded into the baling chamber 10 being greater than that set by the operator.

In practice, the plunger 32 in the baling chamber 10 may perform more than one cycle while the desired mass of crop is being accumulated in the intake duct 20. The intake duct capacity referred to above and displayed to the operator is measured in terms of the number of cycles of the plunger required for the density in the intake duct 20 to reach the value at which the associated sensor initiates a stuffer cycle.

The intake duct 20 capacity need not be a whole number of plunger cycles. Ideally, the time taken to achieve the crop density level chosen to initiate a stuffer cycle should be slightly less than a whole number multiple of the plunger cycle. In this way, after having been tripped, the stuffer 32 does not have to wait long for the plunger 32 to reach a suitable position in the baling chamber 10 to permit the uploading of the slice to be commenced. If the tripping is not well timed, it may be necessary for the stuffer to wait for nearly a whole cycle of the plunger 32 before uploading can be commenced.

From this explanation, it will be clear that the setting of the mechanical sensor 40 in the intake duct at which a stuffer cycle is tripped does not linearly correlate with the density of the formed bales. Because the plunger 32 oscillates with a constant frequency, it will also be clear that the speed of the baler 1 has to be matched to the setting of the mechanical sensor 40 in the intake duct for the stuffer cycles to be correctly synchronised with plunger cycles.

The control of bale weight is complicated further by the fact that the degree to which a slice is compressed by the plunger in the baling chamber varies with the thickness of the slice, the plunger being more successful at compressing thinner slices than thicker ones. An increase in the mass of each slice does not therefore result in an increase in bale weight, more probably it will result in a bale of reduced weight and poorer shape, but the quantised uploading of crop into the baling chamber 10 does affect the accuracy to which the weight of any given bale can be set.

Because of this unavoidable variation in bale weight, one does not rely on the weight of the last formed bale but instead a statistically significant average is developed before changing any of the controls that affect bale weight. This adds further to the hysteresis lag described above.

According to the present invention, the readings taken by the relative density sensors 40 and/or 50 to 58 in the intake duct and/or sensors 60 in the intake area 64 of the baling chamber 10 are correlated with the weight measurement made on the same bale after it has been completed. In this way one can compute a correlation function that maps the relative density readings taken in the intake duct 20 and/or the intake region of the baling chamber 10 onto the cumulative weight of the same slices in completed bales. All subsequent control operations are based on predictions derived by applying the computed correlation function to the density readings taken in the intake duct 20 rather than on final weight measurements made on completed bales.

The readings taken by relative density sensors 40 and/or 50 to 58 in the intake duct and/or sensors 60 in the intake area 64 of the baling chamber 10 can be expressed as a percentage ranging between 100% which corresponds to a sensor signal that correlates to a maximal density ($kg/m^3$) of the crop that forms a slice and 0% which corresponds to a sensor signal that correlates to a minimal density ($kg/m^3$) of the crop that forms a slice. If for example a completed bale is weighed that comprises a number of slices the cumulative weight of these slices is equal to that bale weight. If for example a completed bale has a weight of 400 kg and comprises twenty slices, the mean weight of these slices is 40 kg. To correlate the mean weight of these slices to their measured relative density one could for example correlate that mean weight to the mean of the measured relative densities of these respective slices. If the mean of these measured relative densities was for example 50%, then a subsequent measured relative density of 50% of a new slice can be correlated to a predicted weight of 40 kg of the slice in the intake duct 20 and/or the intake region 64 of the baling chamber 10 by the control system 130 of the baler as the volume of the slice ($m^3$) is known to be constant. If for example due to a change in crop conditions, for example a change in moisture content during the course of the day, a completed bale comprising a number of slices with measured relative densities of which the mean is 50% has a weight of 380 kg, then the control system 130 will be able to adapt its correlation such that a subsequent measured relative density of 50% of a new slice can be correlated to a predicted weight of 38 kg of the slice in the intake duct and/or the intake region 64 of the baling chamber 10. It is clear that the above is only one example of establishing this correlation and that numerous methods are known to accomplish this.

In this way it is possible for the control system 130 to determine a predicted weight of the bale being formed in the baling chamber 10 based on the predicted weight of its constituting slices without the above mentioned hysteresis lag.

According to an alternative embodiment of the invention, the baler 1 further comprises a sensor for measuring the size of bales being formed. In this way based on the measured weight of the completed bale and its size it is possible to determine the absolute density ($kg/m^3$) of this completed bale and thus the cumulative absolute density of its constituting slices. Analogous as mentioned above subsequent measured relative densities (%) can be correlated to a predicted absolute density ($kg/m^3$) of the slice in for example the intake duct when the measured length of these slices is also taken into account. Alternatively the control system 130 could also be operative to determine a predicted absolute density ($kg/m^3$) of the bale being formed in the baling chamber 10 based on the predicted absolute densities of its constituting slices without the above mentioned hysteresis lag.

According to an embodiment of the invention the predicted weight or absolute densities of the slices or the bale being formed can simply be displayed on for example a display unit connected to the baler controller in order to inform the driver so that he can react to changes without any hysteresis lag for example to obtain a desired bale weight.

According to still a further embodiment of the invention the control system alters the settings of the operating parameters of the baler in dependence upon the predicted weight of the slice in the intake duct 20 or the bale being formed in the baling chamber 10 for example to enable a desired bale weight or absolute bale density to be achieved. The desired bale weight or absolute bale density can for example be inputted by an operator into an input device connected to the baler control system.

In still a further embodiment of the invention, the control system takes control of the baler.

The control system 130 comprises a data processor that receives input signals from for example a baler speed sensor, a bale weighing mechanism 126c, and a load cell measuring the reaction force on the plunger and hydraulic pressure of compression system, slice thickness, friction measurement, non-contact density sensors 50-58 in the intake duct, moisture or crop-content, inclination, direction, etc. The data processor also receives a signal indicative of the prevailing intake duct capacity as described above. The data processor is thus capable of determining that the predicted bale weight differs from the desired bale weight by more than a preset factor. When this occurs, the data processor knows the predicted bale weight is not within the limits of acceptability and takes an action to correct the situation.

The manner in which the data processor arrives at a recommended action is not fundamental to the present invention. It may simply rely on values derived from a look-up table in which the stored values have been determined empirically or it may employ a mathematical algorithm that generates suitable settings for the various parameters. As a further possibility, the data processor may employ a so-called expert system which essentially learns to avoid past mistakes.

When a group of suitable control parameter settings is determined by the data processor, the desired settings are compared with the actual setting and a recommended action is taken by the data processor to change the parameter that differs most from the desired settings. Preferably, the data processor changes the parameter to a value halving the difference between its current setting and the desired setting determined by the data processor.

The square baler according to the invention as defined in the claims is of course not limited to the exemplary embodiments as described and shown in the drawings, but can equally comprise combinations and variations that fall within the scope of protection of the claims.

The invention claimed is:

1. A square baler comprising:
   a control system;
   a baling chamber having a compression element configured for movement therein;
   an intake duct leading toward the baling chamber;
   a sensor for measuring the weight of completed bales,
   at least one density sensor configured for measuring a relative density of crop slices within at least one of the intake duct and an intake region of the baling chamber, and
   the control system configured to receive a signal from the density sensor;
   wherein the control system is determines a predicted weight of a slice in the at least one of the intake duct and the intake region of the baling chamber derived from the measured relative density values of the slice and a computed correlation; and
   wherein the correlation used by system is determined from the measured relative density of a number of slices in the at least one of the intake duct and the intake region of the baling chamber with the cumulative weight of the number of slices after they have been compressed and bound to form a completed bale.

2. A square baler according to claim 1, wherein the control system is programmed to determine a predicted weight of the bale being formed in the baling chamber based on the predicted weight of slices constituting the bale.

3. A square baler according to claim 1, wherein the control system is programmed to determine settings of operating parameters of the baler in dependence upon the predicted weight of the slice in at least one of the intake duct and the intake region of the baling chamber.

4. A square baler according to claim 1, wherein the control system is programmed to determine settings of operating parameters of the baler to enable a desired bale weight to be achieved.

5. A square baler according to claim 1, wherein the baler further comprises a sensor for measuring the size of bales being formed and its constituting slices; and that the control system is programmed to determine a predicted absolute density of the slice in the at least one of the intake duct and the intake region of the baling Chamber derived from the predicted weight of this slice and the measured size of this slice received from the sensor for measuring bale size.

6. A square baler according to claim 5, wherein the control system is programmed to determine a predicted absolute density of the bale being formed in the baling chamber based on the predicted absolute density of its constituting slices.

7. A square baler according to claim 5 wherein the control system is operative to determine settings of operating parameters of the baler in dependence upon the predicted absolute density of the slice in the at least one of the intake duct and the intake region of the baling chamber.

8. A square baler according to claim 1, wherein the control system is programmed to determine settings of operating parameters of the baler to enable a desired absolute bale density to be achieved.

9. A square baler according to claim 1, wherein the correlation is a simple weighting factor.

10. A square baler according to claim 1, wherein the correlation comprises an algorithm mapping the measured relative densities of slices in the at least one of the intake duct and the intake region of the baling chamber with the cumulative Weight of the same slices in completed bates.

11. A square baler according to claim 1, wherein the correlation comprises a look-up table.

12. A square baler according to claim 3, wherein compression element is a plunger and the operating parameters are the load on the plunger, speed of a stuffer, density in an intake duct of the baler at which a stuffer cycle is triggered and speed of movement of the baler.

13. A square baler according to claim 1, wherein the correlation is determined using a mean weight of slices of the completed bale and a mean of measured relative densities of the respective slices.

* * * * *